Aug. 20, 1968     D. L. HAM     3,397,575

MAGNETIC FLOWMETER

Filed Feb. 17, 1965     2 Sheets-Sheet 1

INVENTOR.
DONALD L. HAM
BY
ATTORNEYS

INVENTOR.
DONALD L. HAM
BY
Busser, Smith & Harding
ATTORNEYS

1

3,397,575
MAGNETIC FLOWMETER
Donald L. Ham, Northampton, Pa., assignor to Fischer
 & Porter Company, Warminster, Pa., a corporation of
 Pennsylvania
Filed Feb. 17, 1965, Ser. No. 433,397
1 Claim. (Cl. 73—194)

ABSTRACT OF THE DISCLOSURE

A magnetic flowmeter comprising a conduit passing a liquid through a magnetic field is provided with a pair of sensing electrodes arranged perpendicularly to the direction of flow and to the direction of the magnetic field. Each electrode is surrounded by a conductive annulus insulated from the electrode and unconnected to the sensing circuitry so that each annulus is free to assume its own potential.

---

This invention relates to magnetic flowmeters of the type in which a potential induced in a liquid flowing through a magnetic field is utilized as a measure of rate of flow. In such meters the magnetic field is essentially at right angles to the direction of liquid flow, and the potential is picked up by a pair of electrodes arranged on a line mutually perpendicular to the direction of flow and the direction of the magnetic field. As is well known, the current or potential outputs produced in a flowmeter of this type are very small for ordinary flows to be measured and particularly when the fluid which is being measured has a high resistivity. Consequently, disturbing factors must be kept at a minimum for proper flow measurement. One of the factors involved is the zero drift occurring at the source of the small potentials or currents. A typical accuracy of such meters has been 1% of full scale. This specification implies a fixed constant allowable error as a tolerance on the flow reading anywhere on the scale. However, in certain cases it is desirable that the system should have an allowable error specified as a percentage of the measured flow, as, for example, 0.5% of the reading between full scale and 10% of full scale. In such a case the allowable error at 10% of full scale is only 0.05% of the maximum full scale value. The absolute magnitude of allowable error is accordingly quite small, and for acceptable results not only must the entire system be controlled very precisely but the stability of the zero point must be very good.

Studies have indicated that the zero (measured at zero flow) varies with time in dependence on temperature, fluid conductivity and the surface condition of the insulated interior of the pipe as well as the surface condition of the electrodes. In a high accuracy meter this drift must be reduced. While studies have indicated that the drift has a correlation with temperature, it appears that in reality the major dependence of the drift is upon fluid conductivity which varies with temperature. It was also determined that zero drift was dependent upon the elapsed time since cleaning of the electrodes and of the inner wall of the pipe in the vicinity of the electrodes.

The present invention relates to a modified electrode configuration which gives a reduction in zero drift by a factor of approximately 10. In accordance with the invention each electrode presenting a conductive surface to the fluid is surrounded by a conductive equipotential ring spaced radially from it and insulated therefrom. While the ring may be driven to the potential of the electrode, it has been found that the best results are obtained if the ring is unconnected to the circuit, simply forming an equipotential annulus free to assume its own potential.

Figure 1:
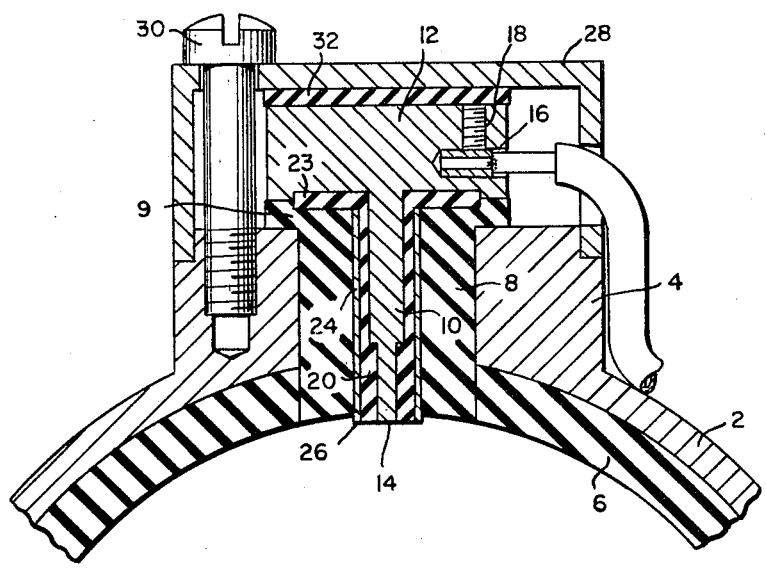
Figure 2:
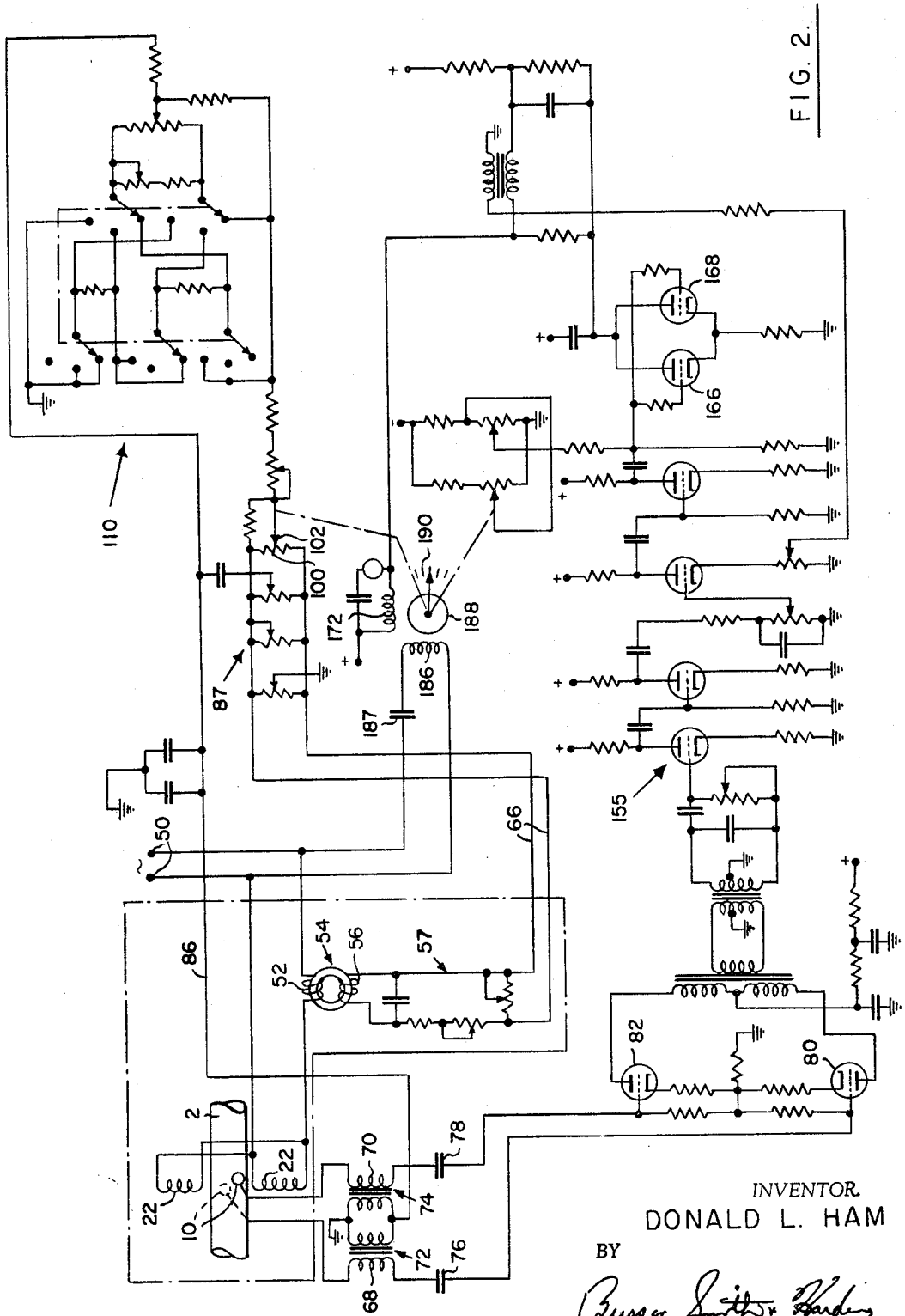

The attainment of the objects of the invention may be best made clear by a consideration of an embodiment of the invention with reference to the accompanying drawings, in which:

FIGURE 1 is a sectional view taken transversely to the axis of the pipe and showing a desirable electrode assembly; and FIGURE 2 is a schematic diagram showing the electrical aspects of the flowmeter.

While a particular flowmeter is illustrated, and will be described herein, it will be evident that the invention may be applied to flowmeters having different constructions, and, in particular, different electrical systems for the measurement of the flow. To present a consistent picture, however, the disclosure, particularly in its electrical aspects, follows that of Kass patent 3,094,000, dated June 18, 1963.

Referring first to FIGURE 1, the metallic pipe of the flowmeter is indicated at 2. The pipe is provided at the location of each electrode assembly with a boss 4, it being understood that while only one electrode assembly is shown in detail, there are two of these at opposite ends of a diameter of the pipe. While a pipe of insulating material may be used, it is usually desirable to provide a metallic pipe of aluminum or other metal, in which case interior insulation is required in the vicinity of the electrodes as indicated at 6 provided by a liner of insulating material such as rubber, or the like. This insulating liner may take various forms and need not be described in detail. A bore in each boss 4 is provided with an insulating sleeve 8 having a flange 9 by which it is clamped in position as will appear later. Desirably the inner end of the sleeve 8 fits fairly tightly an opening in the liner 6 though this is not essential and in many cases it is desirable to have fluid communication between the interior and the exterior of the liner.

The electrode is provided by a pin 10, which may be of stainless steel, provided with an outer head 12 and with a reduced inner end. The transverse inner surface 14 of pin 10 provides the actual electrode. An opening 16 in the head 12 is provided for insertion of the end of a conductor which is clamped in position by a set screw 18. Surrounding the pin 10 is an insulating sleeve 20 provided with a flange 23 to clamp it in position. Surrounding this sleeve 20 is a tube 24 presenting to the fluid an annular surface 26 coaxial with the end 14 of the electrode. A tube 24 is used for convenience of assembly, since only its exposed surface at 26 has significance, and if desired it could take the form of a ring of very small thickness mounted at the end of the insulator 20. The tube or ring may be of stainless steel or other non-corrodible metal. The tube has a tight fit in the insulating sleeve 8.

To complete the picture of the assembly, the parts described are clamped together by a cap 28 secured by a screw 30 to the boss 4 with the interposition of an insulating washer 32 so that the electrode is insulated from the cap.

As will be evident from what has been described, the tube 24 is electrically unconnected to the system except for its annular end contact at 26 with the fluid being measured. Because of its high conductivity it presents an equipotential surface to the liquid.

While dimensions are not critical, the annulus provided at 26 should desirably be close to the electrode surface 14 which it surrounds, and typical dimensions are the following:

With an electrode presenting a disc-like surface 14 having a diameter of 0.062 inch, the exposed annulus 26 may have a typical diameter of approximately ¼" with a radial thickness of 0.025 inch, i.e., the wall thickness of the tube 24. The radial thickness of the annular surface at 26 is not critical and it may be considerably greater than just indicated; what is important is the provision of an equipotential conducting surface at least substantially surrounding each electrode.

With the described arrangement, the zero drift is greatly reduced to make possible accuracies of the type described above. The theory of the operation involved is not specifically known; but apparently the provision of the equipotential surface at 26 reduces greatly the disturbing effects of variable conductivity of the fluid (due to temperature or other causes) and also reduces the effects apparently connected with surface conditions (clean or dirty) of the insulating liner in the vicinity of the electrodes. The electrode configuration has the same advantages even if the tube is entirely of insulating material such as fiberglass so that a separate insulating liner such as 6 is unnecessary.

Any desired insulating materials may be used though it has been found advantageous to use at 20 an insulating sleeve separating the electrode from the equipotential annulus which is made of polytetrafluoroethylene (Teflon). This material presents a surface which is quite immune to surface conditions, resisting accumulation of soilds.

For a full appreciation of the invention, there may now be described the associated matters which, as already noted, are set forth in detail in said Kass patent. Windings 22 associated with an iron core structure provide a field which is at right angles to the diameter through the electrodes and to the pipe axis. The field thus produced may be direct or alternating, but an alternating magnetic field is most useful for securing best results, and it may be assumed for further description that alternating field excitation is used.

Referring now to FIGURE 2, alternating current is supplied from the terminals 50 connected to the usual power supply, for example at sixty cycles. The magnetic field windings 22 are connected in parallel and to the supply terminals. In series with the field windings there is the primary winding 52 of the toroidal transformer 54 the secondary winding 56 of which is connected to an adjusting network from which an output is taken through lines 66.

The leads from the electrodes 10 are connected individually through the secondaries 68 and 70 of identical transformers 72 and 74, and through the capacitors 76 and 78 to the grids of input triodes 80 and 82 forming part of an amplifier generally indicated at 155. The primaries of the transformers 72 and 74 are connected in parallel between ground and a line 86 in such fashion that signals fed back through the line 86 will null the signals from the electrodes, the connection being such that opposition to the electrode potential is provided by each transformer.

The line 86 receives current from the lines 66 previously mentioned through a network 87 and a range adjustment network 110. The network 87 comprises adjustments for centering, setting the input resistance, and for manual null control of quadrature signals. It also includes a potentiometer 100 provided with a contact 102 which is driven by a motor 188 to effect automatic balancing of the circuit and provide on a scale 190 a direct indication of flow.

The amplifier 155 terminates in a pair of power tubes 166 and 168 operating as a class C stage. This stage supplies current to the field winding 172 of the motor 188, the other field winding 186 of this motor being provided with current from the terminals 50 through the phase adjusting capacitor 187.

The operation of the measuring system is described in detail in said Kass patent, and since the details of operation are not of special significance in connection with the present invention it will suffice to point out that when the circuit in FIGURE 2 is not balanced inputs are provided to the triodes 80 and 82 and through the amplifier 155 the motor 188 is operated in one direction or the other, as required to attain balance, with resulting provision of a signal through connection 86 to balance the circuit, i.e. to provide zero in-phase signals to the triodes 80 and 82. When balance has been thus achieved (through adjustment of contact 102 of potentiometer 100) the flow may be directly read on the scale 190.

It will be evident that other indicating or recording devices may be used, with full achievement of the advantageous results of the invention. It will also be clear that various details of construction may be changed without departing from the scope of the invention as defined in the following claim.

What is claimed is:

1. A magnetic flowmeter comprising a conduit for liquid flow, means providing a magnetic field through liquid flowing in said conduit and transverse to the direction of flow, a pair of electrodes having portions in contact with the liquid in said magnetic field and arranged on an axis transverse to both the magnetic field and to the direction of flow at their location, said conduit providing an insulated surface to the liquid through regions about said portions of the electrodes, means providing a conductive equipotential surface in contact with the flowing liquid at least substantially encircling each of said portions of the electrodes and closely adjacent thereto but separated therefrom by an insulated surface exposed to the flowing liquid, and means connected to the electrodes and providing a response measuring the signals appearing between said electrodes, said means providing the conductive equipotential surfaces being electrically isolated from each other and from the electrodes except for conduction through the liquid, so that they are free to assume their own potentials in dependence upon conditions in the liquid.

References Cited

UNITED STATES PATENTS 2,733,604    2/1956    Coulter _____ 73—194

RICHARD C. QUEISSER, *Primary Examiner.*

CHARLES A. RUEHL, *Assistant Examiner.*